(12) United States Patent
Marchal

(10) Patent No.: US 7,614,503 B2
(45) Date of Patent: Nov. 10, 2009

(54) APPARATUS FOR SEPARATING LIQUID AND SOLID MATERIAL FROM A MIXTURE

(75) Inventor: Jan Marinus Marchal, Utrecht (NL)

(73) Assignee: Pannevis B.V., Utrecht (NL)

( * ) Notice: Subject to any disclaimer, the term of this patent is extended or adjusted under 35 U.S.C. 154(b) by 0 days.

(21) Appl. No.: 11/846,686

(22) Filed: Aug. 29, 2007

(65) Prior Publication Data
US 2007/0289916 A1 Dec. 20, 2007

Related U.S. Application Data

(62) Division of application No. 10/312,274, filed as application No. PCT/NL01/00469 on Jun. 22, 2001, now abandoned.

(51) Int. Cl.
*B01D 33/056* (2006.01)
(52) U.S. Cl. ........................ 210/401; 210/400; 210/406; 210/783
(58) Field of Classification Search ................. 210/783, 210/400, 401
See application file for complete search history.

(56) References Cited

U.S. PATENT DOCUMENTS

| 4,351,726 A | * | 9/1982 | Somerville | 210/401 |
| 2004/0055971 A1 | * | 3/2004 | Marchal | 210/783 |
| 2007/0289916 A1 | * | 12/2007 | Marchal | 210/400 |

FOREIGN PATENT DOCUMENTS

| EP | 33551 A1 | * | 8/1981 |
| EP | 0839562 A1 | | 6/1998 |

OTHER PUBLICATIONS

A.A.J.A. Prinssen, "Vacuum Belt Filters", Proceedings of the Filtration Society, Mar./Apr. 1979 Filtration & Separation, pp. 176-180.

* cited by examiner

*Primary Examiner*—Robert James Popovics
(74) *Attorney, Agent, or Firm*—The Webb Law Firm

(57) ABSTRACT

The present invention relates to a device for separating liquid and solid material from a mixture which includes a filter cloth for allowing through the liquid and holding back the solid material; a carrier belt for supporting the filter cloth with the mixture thereon, wherein the carrier belt is provided with one or more openings close to at least one of the side edges or at least eccentrically thereof; a support construction for supporting the carrier belt movable relative thereto; and a suction box arranged under the support construction and/or on the side of the carrier belt and connected to the optional openings in the carrier belt for extracting liquid from the mixture.

4 Claims, 3 Drawing Sheets

APPARATUS FOR SEPARATING LIQUID AND SOLID MATERIAL FROM A MIXTURE

CROSS REFERENCE TO RELATED APPLICATIONS

This application is a divisional of U.S. application Ser. No. 10/312,274, filed Jul. 17, 2003, which is the United States national phase of International Application No. PCT/NL01/00469, filed Jun. 22, 2001, which designated, inter alia, the United States, and which claimed the benefit of Netherlands Application No. 1015502, filed Jun. 22, 2000.

BACKGROUND OF THE INVENTION

1. Field of the Invention

The present invention relates generally to separation of fluids from solids, and, in particular, apparatus and methods for separation of fluids from solids using lateral and lower extraction through a belt.

2. Description of Related Art

Devices for separating liquids and solids have been marketed for many years. A first type of device thereof is provided with a suction box co-displacing with a filter cloth and making a reciprocating movement.

In another device, side boxes are situated close to a side edge of a carrier belt for the filter cloth, and the liquids are sucked through channels in the carrier belt to the suction boxes. This latter device has the advantage over the above-mentioned first device in that the suction boxes can be of relatively simple design, since they are placed in stationary position. Due to the arrangement close to the edges, the suction boxes are readily accessible for inspection, cleaning and maintenance.

In this known second device, the sealing of the carrier belt relative to the suction box is a problem. The possible solutions to this problem are costly and/or require frequent maintenance.

SUMMARY OF THE INVENTION

The present invention provides a device for separating liquid and solid material from a mixture, comprising:
 a filter cloth for allowing through the liquid and holding back the solid material;
 a carrier belt for supporting the filter cloth with the mixture thereon, wherein the carrier belt is provided with one or more openings close to at least one of the side edges or at least eccentrically thereof;
 a support construction for supporting the carrier belt movable relative thereto; and
 a suction box arranged under the carrier belt and connecting to the openings in the carrier belt for extracting liquid from the mixture, and
 wherein the openings are situated in the region between the outer edge and a quarter of the width of the carrier belt, wherein the carrier belt has a ribbed profile, between the ribs of which channels extend to the side edges thereof, wherein the carrier belt is of plastic or rubber and provided with a heel part and wherein the one or more openings are arranged in the heel part, wherein the suction boxes are provided with a connection for discharging volatile constituents from the mixture.

Further advantages, features and details of the present invention will be elucidated on the basis of the following description of a preferred embodiment thereof with reference to the annexed drawings, in which:

DETAILED DESCRIPTION OF THE INVENTION

Figure 1:
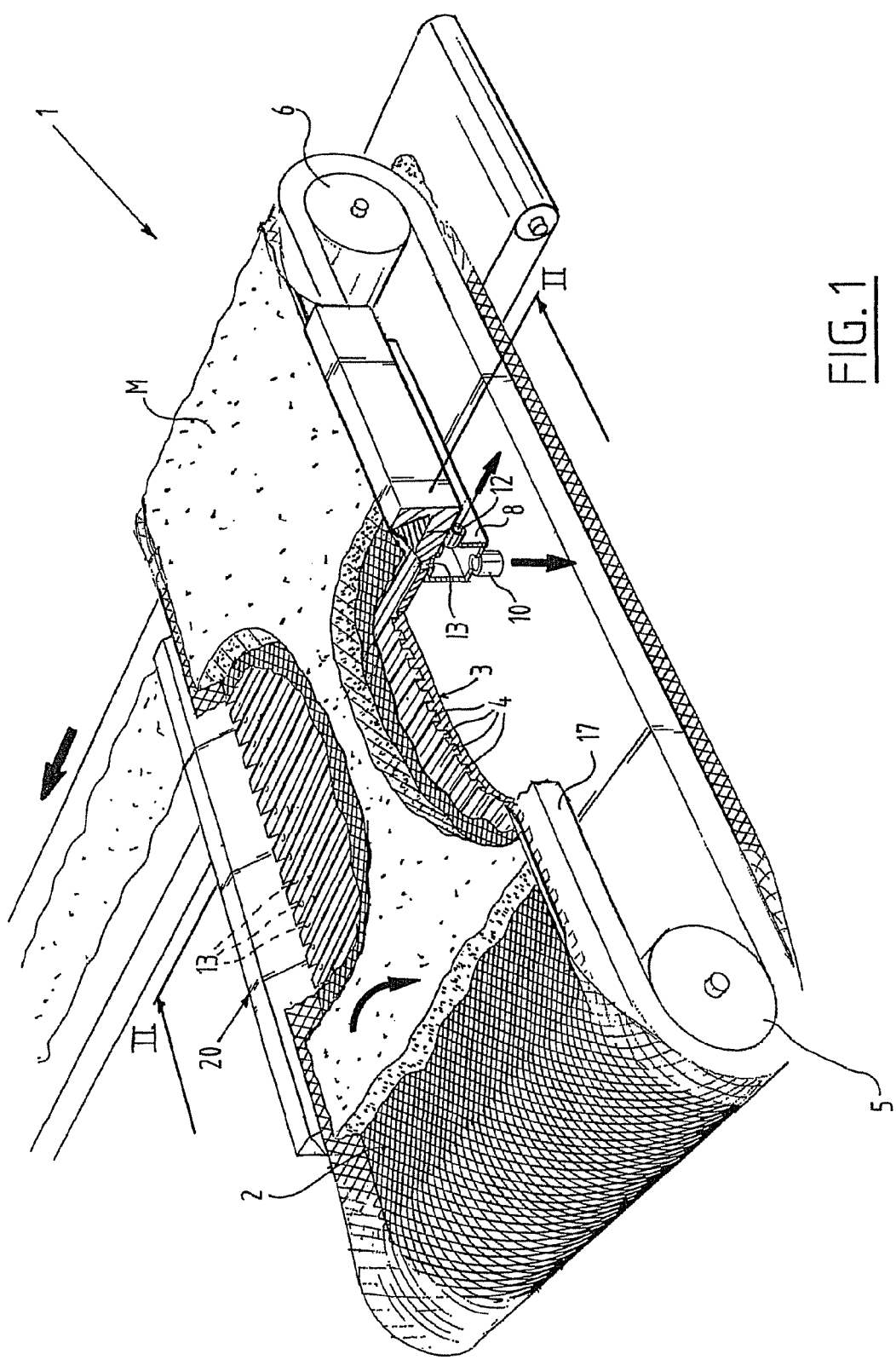
FIG. 1 is a perspective view of a preferred embodiment of the device according to the present invention.

In a device 1 (FIGS. 1 and 2), a filter cloth 2 and a rubber belt 3 placed thereunder and provided with channels 4 are trained round rollers 5, 6, at least one of which is driven. Disposed along the edges in stationary position under carrier belt 3 are suction boxes 7, 8 which are provided on the underside with a discharge connection 9 respectively 10 for discharging the liquid sucked through filter cloth 2, while the suction boxes are provided on the top side with suction connection 11 respectively 12, whereby a further separation between volatile constituents of the liquid and less volatile constituents thereof also takes place in suction boxes 7, 8.

The liquid is sucked out of mixture M as according to arrows A, B and C into the suction boxes via openings 13 in carrier belt 3, wherein between carrier belt 3 and suction boxes 7 respectively 8 are arranged seals 14 respectively 15 of wear-resistant material and relatively simple manufacture.

Figure 2:
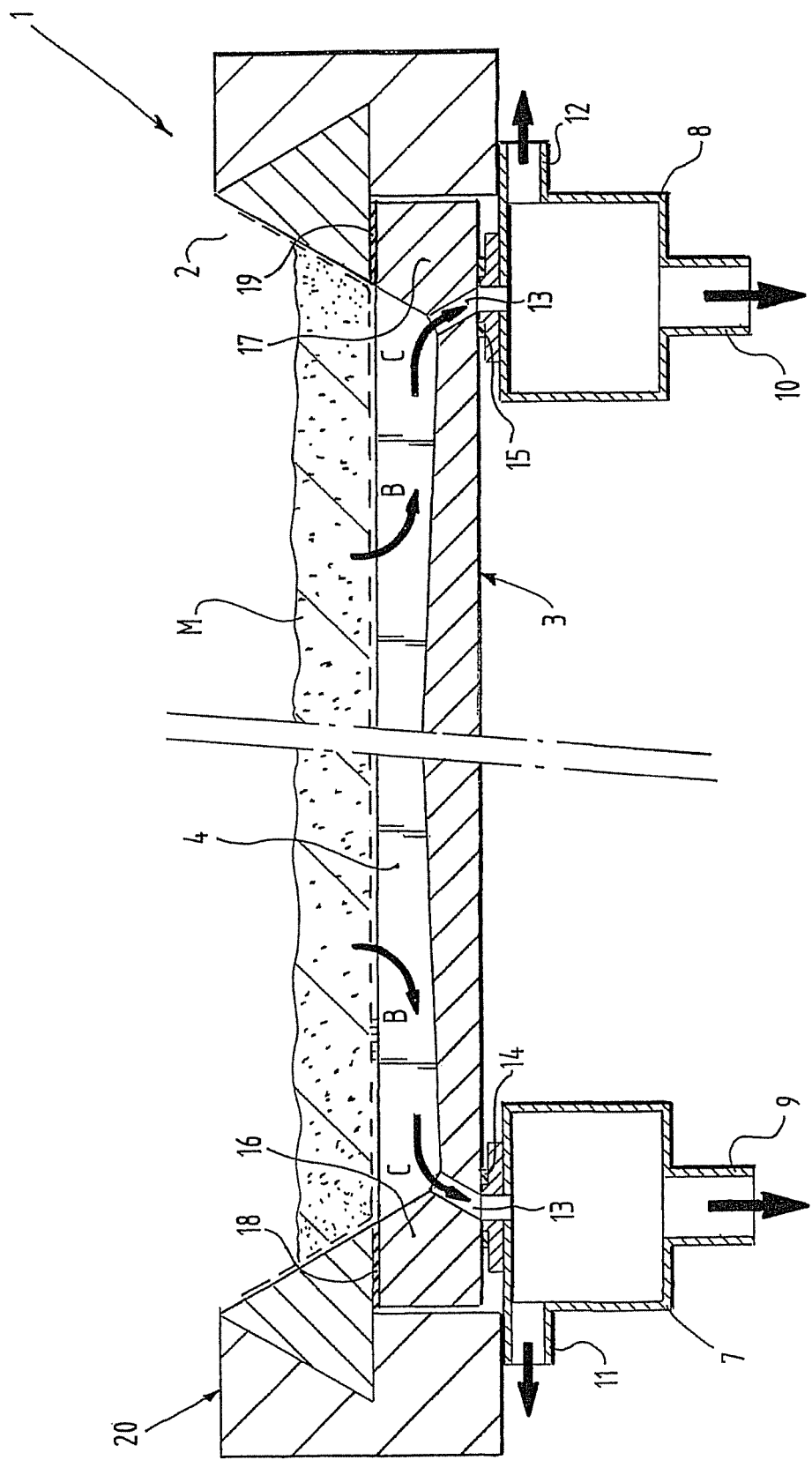
FIG. 2 is a cross-sectional view along the preferred embodiment shown in FIG. 1.

As shown particularly in FIG. 2, the carrier belt is provided on both edges with heel parts 16 respectively 17 in order to ensure that the liquid enters the openings 13 via the arrows. The carrier belt is sealed on the upper side relative to the fixedly disposed construction 20 using seals 18 respectively 19.

The present invention is not limited to the above-described preferred embodiment thereof; the rights sought are rather defined by the following claims, within the scope of which many modifications can be envisaged.

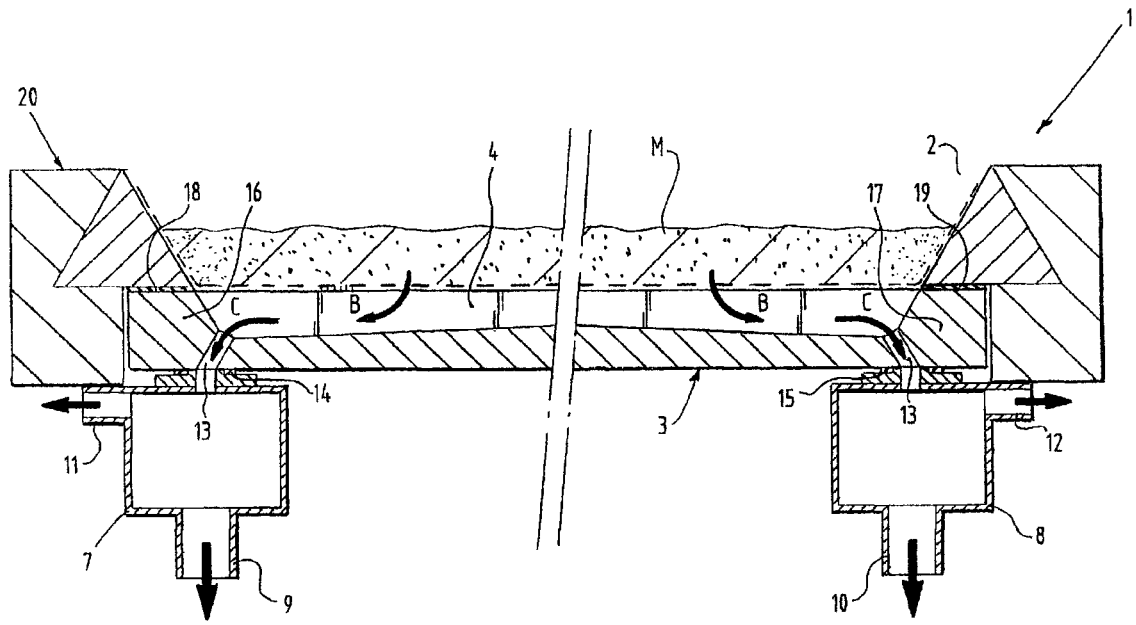

The invention claimed is:

1. A device for separating liquid and solid material from a mixture, comprising:
 a filter cloth for allowing through the liquid and holding back the solid material;
 a carrier belt for supporting the filter cloth with the mixture thereon, wherein the carrier belt is provided with one or more openings close to at least one of the side edges or at least eccentrically thereof;
 a support construction for supporting the carrier belt movable relative thereto; and
 one or more suction boxes arranged under the carrier belt and connected to a respective one of the one or more openings in the carrier belt for extracting liquid from the mixture,
 wherein the carrier belt has a ribbed profile, between the ribs of which channels extend to the side edges thereof, wherein the carrier belt is of plastic or rubber and provided with a heel part and wherein the one or more openings are arranged in the heel part, wherein the one or more suction boxes are provided with a connection for discharging volatile constituents from the mixture,
 wherein the one or more openings are downwardly directed and situated in a region between the outer edge and a quarter of the width of the carrier belt, and
 wherein the one or more suction boxes are arranged under the region between the outer edge and a quarter of the width of the carrier belt and underneath a respective one of the downwardly directed one or more openings.

2. The device as claimed in claim 1, wherein the carrier belt has a thickness of about 25-30 cm.

3. The device as claimed in claim 1, wherein the suction box is provided with a closable hatch for inspection and/or maintenance purposes.

4. The device as claimed in claim 1, wherein a support is situated on the suction box for supporting the carrier belt.

* * * * *

UNITED STATES PATENT AND TRADEMARK OFFICE
CERTIFICATE OF CORRECTION

PATENT NO. : 7,614,503 B2  
APPLICATION NO. : 11/846686  
DATED : November 10, 2009  
INVENTOR(S) : Marchal Page 1 of 1

It is certified that error appears in the above-identified patent and that said Letters Patent is hereby corrected as shown below:

<u>Face of the Patent</u>, See Item (56) FOREIGN PATENT DOCUMENTS, add the following:
-- NL            8303016        3/1985 --.

Figure 3:
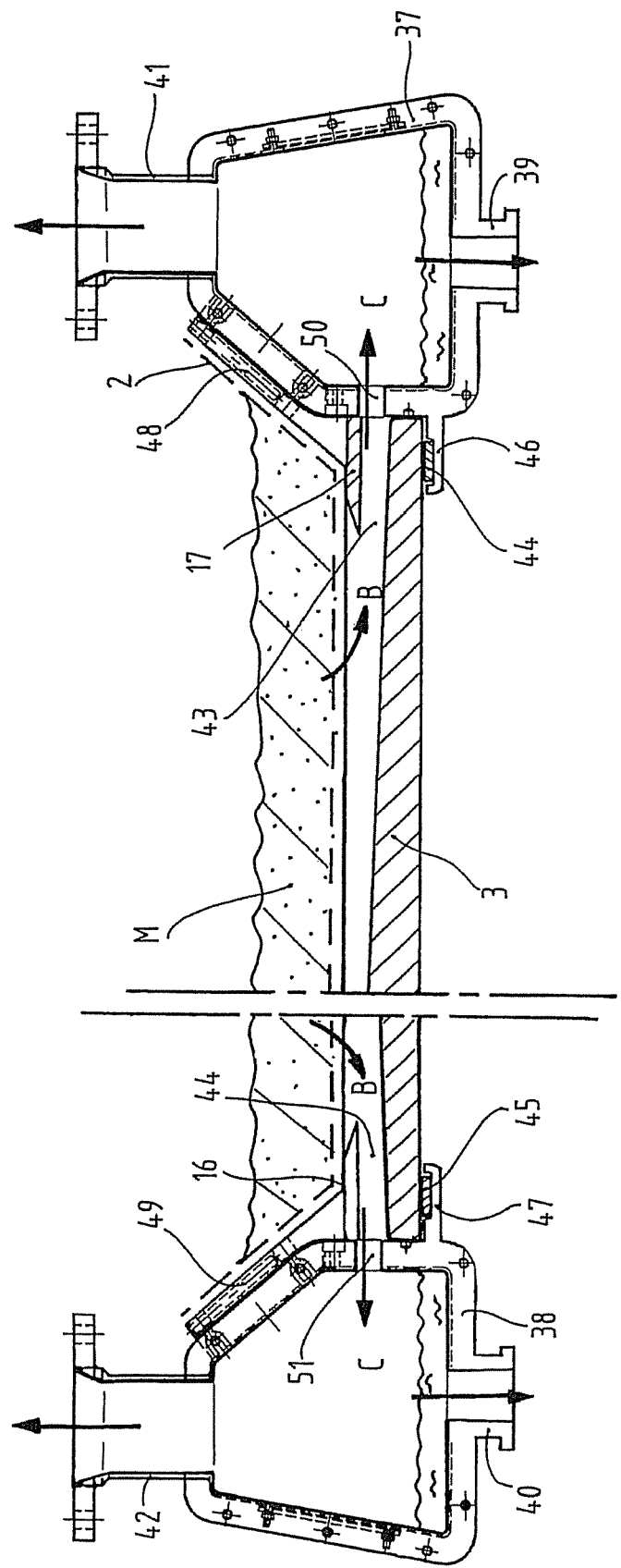
Figure 1:
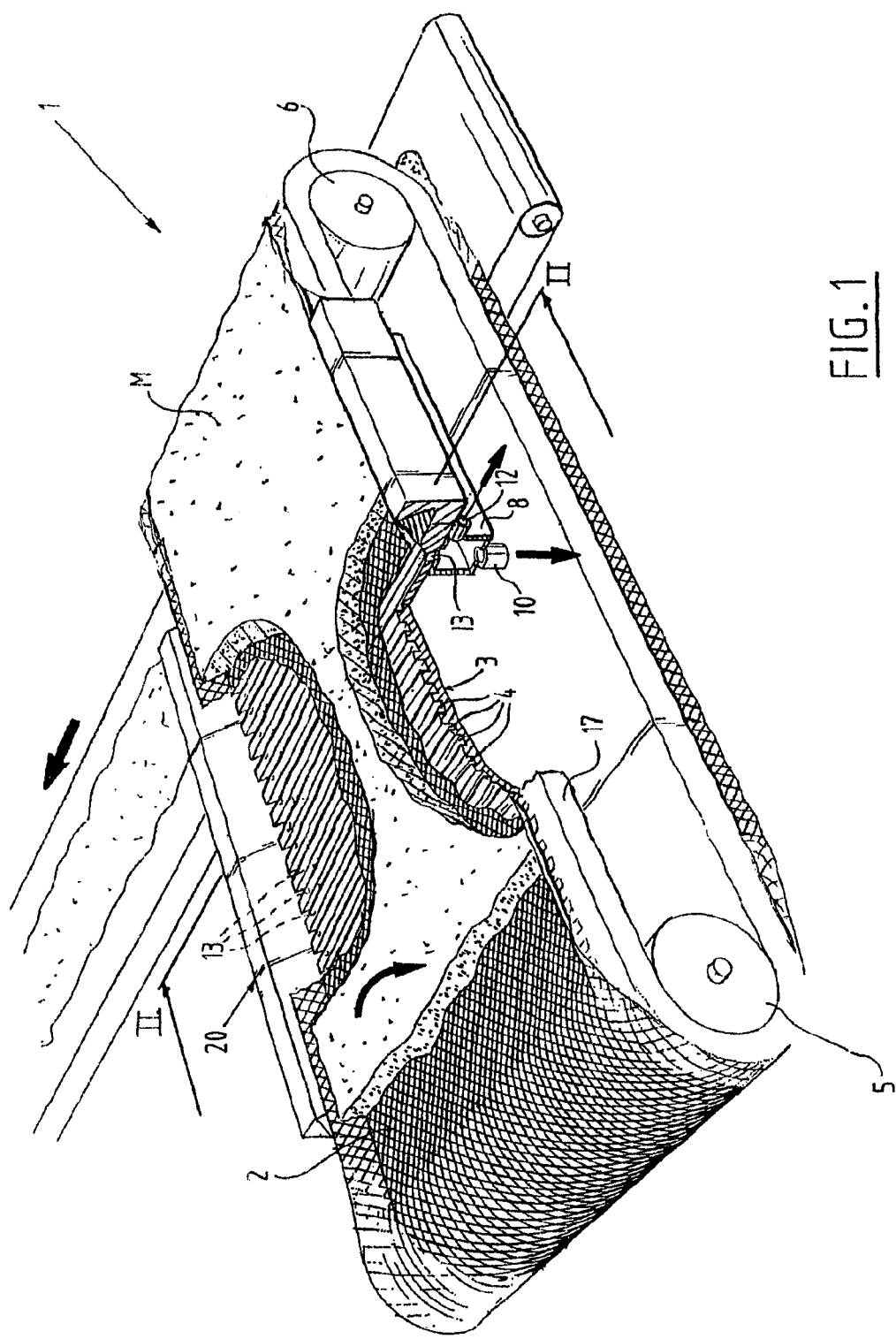
Figure 2:
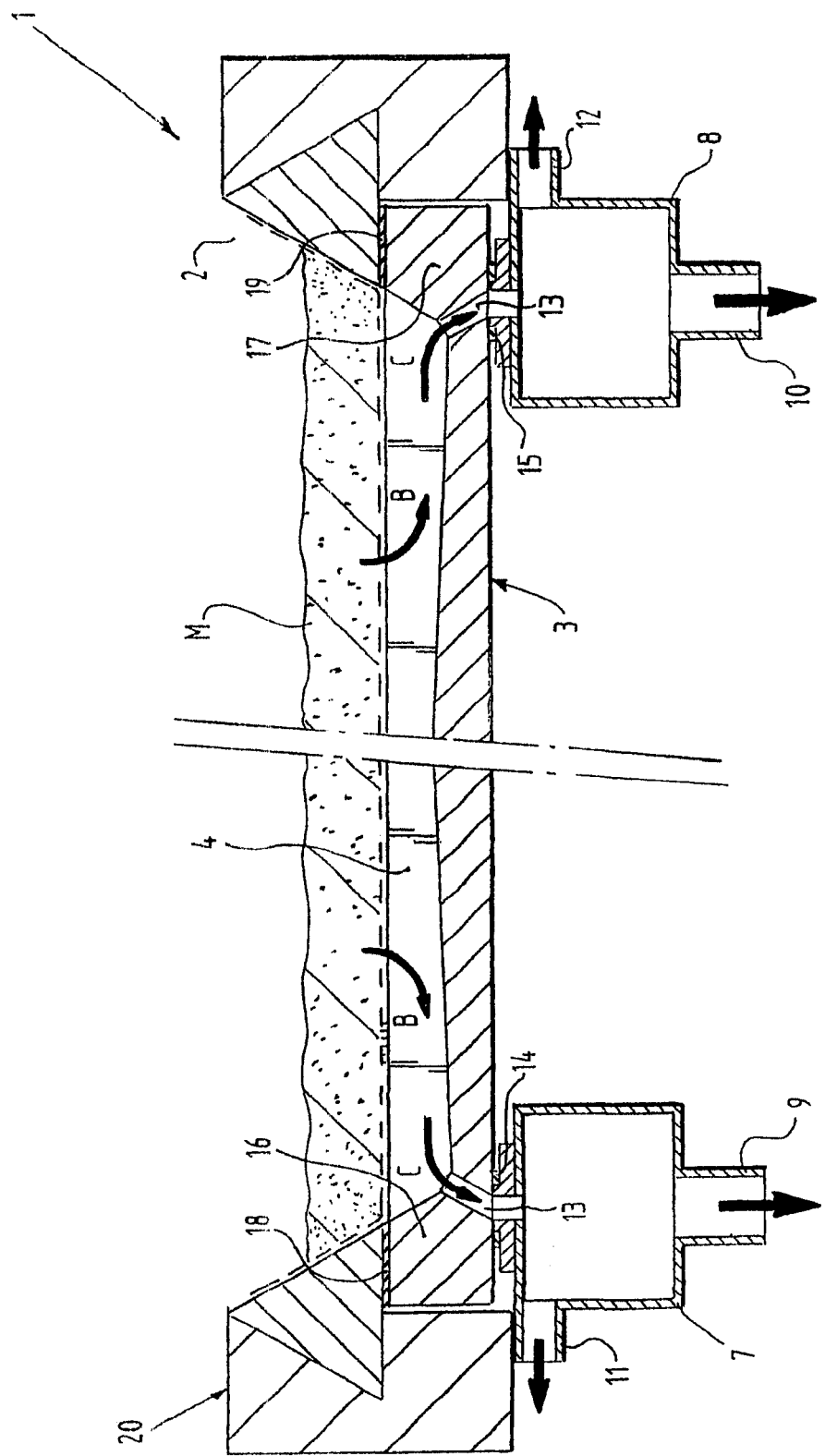

In the Drawings, Sheet 3 of 3, delete FIG. 3.

Signed and Sealed this  
Ninth Day of August, 2011

David J. Kappos  
*Director of the United States Patent and Trademark Office*

UNITED STATES PATENT AND TRADEMARK OFFICE
CERTIFICATE OF CORRECTION

PATENT NO. : 7,614,503 B2  
APPLICATION NO. : 11/846686  
DATED : November 10, 2009  
INVENTOR(S) : Marchal Page 1 of 4

It is certified that error appears in the above-identified patent and that said Letters Patent is hereby corrected as shown below:

Delete the title page and substitute therefore the attached title page showing the corrected number of drawing sheets in patent.

<u>Face of the Patent</u>, See Item (56) FOREIGN PATENT DOCUMENTS, add the following:
-- NL      8303016      3/1985 --.

Delete Drawing Sheets 1-3 and substitute therefore the attached Drawing Sheets 1-2. (Fig. 3 has been deleted.)

This certificate supersedes the Certificate of Correction issued August 9, 2011.

Signed and Sealed this
Thirtieth Day of August, 2011

David J. Kappos
*Director of the United States Patent and Trademark Office*

(12) United States Patent
Marchal

(10) Patent No.: US 7,614,503 B2
(45) Date of Patent: Nov. 10, 2009

(54) APPARATUS FOR SEPARATING LIQUID AND SOLID MATERIAL FROM A MIXTURE

(75) Inventor: Jan Marinus Marchal, Utrecht (NL)

(73) Assignee: Pannevis B.V., Utrecht (NL)

(*) Notice: Subject to any disclaimer, the term of this patent is extended or adjusted under 35 U.S.C. 154(b) by 0 days.

(21) Appl. No.: 11/846,686

(22) Filed: Aug. 29, 2007

(65) Prior Publication Data

US 2007/0289916 A1 Dec. 20, 2007

Related U.S. Application Data

(62) Division of application No. 10/312,274, filed as application No. PCT/NL01/00469 on Jun. 22, 2001, now abandoned.

(51) Int. Cl.
*B01D 33/056* (2006.01)
(52) U.S. Cl. .................. 210/401; 210/400; 210/406; 210/783
(58) Field of Classification Search .......... 210/783, 210/400, 401
See application file for complete search history.

(56) References Cited

U.S. PATENT DOCUMENTS

| | | | | |
|---|---|---|---|---|
| 4,351,726 A | * | 9/1982 | Somerville | 210/401 |
| 2004/0055971 A1 | * | 3/2004 | Marchal | 210/783 |
| 2007/0289916 A1 | * | 12/2007 | Marchal | 210/400 |

FOREIGN PATENT DOCUMENTS

| | | | |
|---|---|---|---|
| EP | 33551 A1 | * | 8/1981 |
| EP | 0839562 A1 | | 6/1998 |

OTHER PUBLICATIONS

A.A.J.A. Prinssen, "Vacuum Belt Filters", Proceedings of the Filtration Society, Mar./Apr. 1979 Filtration & Separation, pp. 176-180.

* cited by examiner

*Primary Examiner*—Robert James Popovics
(74) *Attorney, Agent, or Firm*—The Webb Law Firm

(57) ABSTRACT

The present invention relates to a device for separating liquid and solid material from a mixture which includes a filter cloth for allowing through the liquid and holding back the solid material; a carrier belt for supporting the filter cloth with the mixture thereon, wherein the carrier belt is provided with one or more openings close to at least one of the side edges or at least eccentrically thereof; a support construction for supporting the carrier belt movable relative thereto; and a suction box arranged under the support construction and/or on the side of the carrier belt and connected to the optional openings in the carrier belt for extracting liquid from the mixture.

4 Claims, 2 Drawing Sheets